United States Patent [19]

Taniguchi et al.

[11] Patent Number: 5,026,144
[45] Date of Patent: Jun. 25, 1991

[54] LIQUID CRYSTAL DEVICE, ALIGNMENT CONTROL METHOD THEREFOR AND DRIVING METHOD THEREFOR

[75] Inventors: Osamu Taniguchi, Chigasaki; Hideyuki Kawagishi, Kawasaki; Akira Tsuboyama, Sagamihara; Shinjiro Okada, Kawasaki; Yutaka Inaba, Kawaguchi; Junichiro Kanbe, Yokohama, all of Japan

[73] Assignee: Canon Kabushiki Kaisha, Tokyo, Japan

[21] Appl. No.: 469,809

[22] Filed: Jan. 22, 1990

Related U.S. Application Data

[63] Continuation of Ser. No. 52,695, May 20, 1987, abandoned.

[30] Foreign Application Priority Data

May 27, 1986 [JP] Japan .................................. 61-122420

[51] Int. Cl.$^5$ ........................ G02F 1/133; G09G 3/36
[52] U.S. Cl. ................................ 350/350 S; 350/341; 350/333; 340/805
[58] Field of Search ................... 350/350 S, 333, 341, 350/332; 340/784, 805

[56] References Cited

U.S. PATENT DOCUMENTS

| | | | |
|---|---|---|---|
| 4,144,376 | 3/1979 | Beckmann et al. | 428/429 |
| 4,508,429 | 4/1985 | Nagae et al. | 350/333 |
| 4,563,059 | 1/1986 | Clark et al. | 350/330 |
| 4,634,226 | 1/1987 | Isogai et al. | 350/350 S |
| 4,639,089 | 1/1987 | Okada et al. | 350/341 |
| 4,655,561 | 4/1987 | Kanbe et al. | 350/350 S |
| 4,668,051 | 5/1987 | Mourey et al. | 350/350 S |
| 4,701,026 | 10/1987 | Yazaki et al. | 350/350 S |
| 4,707,078 | 11/1987 | Geary | 350/332 |
| 4,712,873 | 12/1987 | Kanbe et al. | 350/350 S |
| 4,715,688 | 12/1987 | Hanada et al. | 350/350 S |
| 4,770,502 | 9/1988 | Kitazima et al. | 350/350 S |
| 4,778,259 | 10/1988 | Kitayama et al. | 350/350 S |
| 4,796,980 | 1/1989 | Kaneko et al. | 350/350 S |
| 4,820,026 | 4/1989 | Okada et al. | 350/350 S |
| 4,867,539 | 9/1989 | Gooby et al. | 350/346 |

FOREIGN PATENT DOCUMENTS

| | | |
|---|---|---|
| 0032362 | 7/1981 | European Pat. Off. . |
| 0149398 | 7/1985 | European Pat. Off. . |
| 3414704 | 10/1985 | Fed. Rep. of Germany . |
| 0057821 | 4/1985 | Japan ............................ 350/350 S |
| 0123825 | 7/1985 | Japan ............................ 350/350 S |

OTHER PUBLICATIONS

Craighead et al., "New Display Based on Electrically Induced Index Matching in an Inhomogeneous Medium", Appl. Phys. Letter, vol. 40, No. 1, Jan. 1982, pp. 22–24.

Clark et al., "Submicrosecond Bistable Electro-Optic Switching in Liquid Crystals", Appl. Phys. Letter, vol. 36, No. 11, Jun. 1980, pp. 899-901.

Harada et al., "An Application of Chiral Smectic C Liquid Crystal to a Multiplexed Large Area Display", SID Digest 85, vol. XVI, 1985, pp. 131-134.

Ferroelectrics, 1984, vol. 59, pp. 137-144, Patel, J. S., Leslie, T. M. and Goodby, J. W., "A Reliable Method of Alignment for Smectic Liquid Crystals".

Primary Examiner—Stanley D. Miller
Assistant Examiner—Tai V. Duong
Attorney, Agent, or Firm—Fitzpatrick, Cella, Harper & Scinto

[57] ABSTRACT

A liquid crystal device, comprises: a pair of opposite electrodes and a ferroelectric liquid crystal showing a first and a second alignment state depending on the direction of an electric field applied thereto and disposed between the opposite electrodes. The ferroelectric liquid crystal is placed in a stated of causing a relaxation such that, when a voltage pulse equal to the threshold is applied between the opposite electrodes, the ferroelectric liquid crystal causes a change in its molecular alignment state from one molecular alignment state toward the other molecular alignment state and continues the change in its molecular alignment state even after the removal of the voltage pulse until the change reaches a saturation in a certain period.

8 Claims, 6 Drawing Sheets

LIQUID CRYSTAL DEVICE, ALIGNMENT CONTROL METHOD THEREFOR AND DRIVING METHOD THEREFOR

This application is a continuation of application Ser. No. 07/052,695 filed May 20, 1987, now abandoned.

FIELD OF THE INVENTION AND RELATED ART

The present invention relates to a ferroelectric liquid crystal device and an alignment control method therefor, and more particularly, to a ferroelectric liquid crystal device capable of high speed driving and high quality display, an alignment control method therefor, and a driving method therefor.

Clark and Lagerwall have proposed a display device of the type wherein the refractive index anisotropy of a ferroelectric liquid crystal is utilized in combination with a polarizing device to control the transmitted light (Japanese Patent Laid-Open Application No. 107216/1981, U.S. Pat. No. 4,367,924, etc.). The ferroelectric liquid crystal generally assumes chiral smectic C phase (SmC*) or H phase (SmH*) in a specific temperature range, and in this state, has a property of assuming either a first optically stable state or a second optically stable state in response to an electric field applied thereto and retaining the resultant state in the absence of an electric field, i.e., bistability. Further, it has a high response speed in response to the electric field. Thus, a ferroelectric liquid crystal device is expected to be widely used as a display device of a high speed and a memory-type.

In order for an optical modulation device using a liquid crystal showing bistability to exhibit desired driving characteristics, it is necessary that the liquid crystal disposed between a pair of parallel substrates is in a molecular alignment or arrangement state such that switching or transformation between the two stable states is effectively caused. For example, with respect to a ferroelectric liquid crystal in SmC* or SmH* phase, it is necessary for the liquid crystal to form a region (monodomain) wherein the liquid crystal molecular layers are perpendicular to the substrate faces and accordingly the molecular axes are aligned in almost parallel with the substrate faces.

Actually, however, when a ferroelectric liquid crystal cell having such a molecular alignment state where the transformation or switching between at least two stable states is effectively caused is prepared and applied to a display apparatus, the following technical problems have been encountered.

First, the ferroelectric liquid crystal cell has a high response speed which is much faster than that of the conventional TN liquid crystal, but speed of writing into an entire screen or picture is not very fast because, in writing, the scanning lines are selectively scanned line by line and the pixels on a scanning line have to be completed in writing based on given information during the selection period for the scanning line. For example, it has been difficult to write a display with about 400 scanning lines at a so-called "television rate" of 30 msec/picture under normal temperature with a ferroelectric liquid crystal cell developed heretofore.

Further, Kanbe et al have proposed an improved driving method by clarifying that, in a writing operation of a ferroelectric liquid crystal having a memory characteristic, improved driving characteristics are obtained by applying an alternating voltage below the threshold to the pixels on the non-selected scanning lines (Japanese Patent Laid-Open Applications 33535/1985, 156047/1985, etc.; U.S. Patent applications Ser. No. 598800, 691761 and 701765). In driving of a conventional ferroelectric liquid crystal device according to the improved driving method, however, there is observed a problem that ferroelectric liquid crystal molecules at a pixel on a nonselected scanning line cause "fluctuation", even though they do not cause switching, under the application of alternating voltages below the threshold voltage as will be described hereinafter, so that the optical characteristics of pixels on the nonselected scanning lines do not become constant.

Accordingly, a second technical problem is that a conventional ferroelectric liquid crystal cell, when applied to a display apparatus, causes a lowering in contrast on the entire display picture and a flickering of the picture.

SUMMARY OF THE INVENTION

An object of the present invention is to provide a novel ferroelectric liquid crystal device, an alignment control method therefor and a driving method therefor capable of solving the above mentioned problems.

Particularly, a principal object of the present invention is to provide a ferroelectric liquid crystal device capable of providing a high contrast on the entire display picture and a high quality of image free of flickering on the display picture; an alignment control method and a driving method therefor.

According to a first aspect of the present invention, there is provided a liquid crystal device comprising: a pair of opposite electrodes and a ferroelectric liquid crystal showing a first and a second alignment state depending on the direction of an electric field applied thereto and disposed between the opposite electrodes; the ferroelectric liquid crystal being placed in a state of causing a relaxation such that the ferroelectric liquid crystal, when a voltage pulse equal to the threshold is applied between the opposite electrode, causes a change in its molecular alignment state from one molecular alignment state toward the other molecular alignment state and continues the change in its molecular alignment state even after the removal of the voltage pulse until the change reaches a saturation in a certain period.

According to a second aspect of the present invention, there is provided an alignment control method, comprising the steps of: disposing a ferroelectric liquid crystal showing a first and a second stable state depending on the direction of an electric field applied thereto between a pair of substrates at least one of which is provided with a uniaxial orientation axis; and applying to the ferroelectric liquid crystal an alternating voltage with at least one of its voltage value and frequency changing with time to provide a molecular alignment state showing an increased tilt angle.

According to a third aspect of the present invention, there is provided a driving method for a liquid crystal device comprising pixels arranged two-dimensionally, each pixel comprising a pair of opposite electrodes and a ferroelectric liquid crystal showing a first and a second alignment state depending on the direction of an electric field applied thereto and disposed between the opposite electrodes; the driving method comprising:

applying a first writing pulse to a selected pixel thereby to change the molecular alignment state of the ferroelectric liquid crystal at the selected pixel from one molecular alignment state toward the other molecular alignment state; and in a relaxation period after the removal of the first writing pulse wherein the change in the molecular alignment state continues to a saturation at the selected pixel, applying a second writing pulse to another selected pixel.

Incidentally, as an alignment control method for a ferroelectric liquid crystal, there has been known a method of using an alignment control film subjected to a uniaxial orientation treatment such as rubbing or oblique vapor deposition. A ferroelectric liquid crystal with a nonhelical structure aligned by means of such an alignment control film shows a tilt angle $\theta$ (angle $\theta$ shown in FIG. 2 which will be described hereinafter) which is generally smaller than a tilt angle of the ferroelectric liquid crystal with a helical structure (angle , a half of the apical angle of a cone shown in FIG. 1 described hereinafter).

Figure 3:
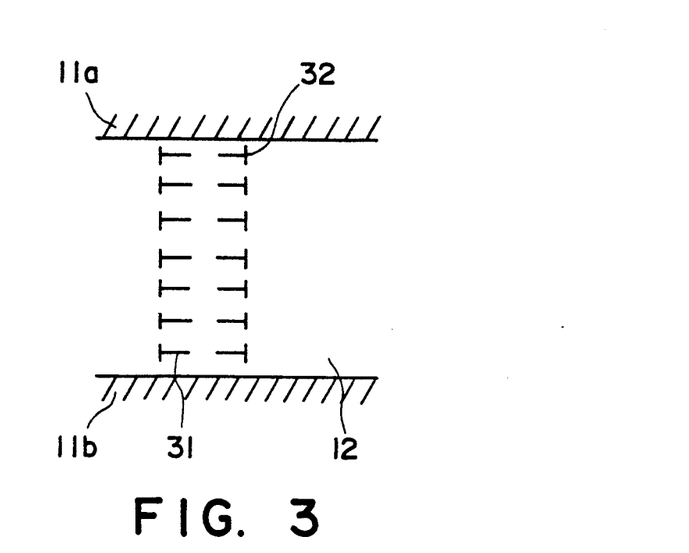
FIG. 3 is a sectional view of a liquid crystal cell for schematically illustrating a uniform alignment state.

According to Clark and Lagerwall, the tilt angle of a ferroelectric liquid crystal with a non-helical structure realizing the bistability should be the same as the tilt angle of the ferroelectric liquid crystal in a helical structure. In fact, however, the tilt angle $\theta$ in the nonhelical structure is smaller than the tilt angle in the helical structure. More specifically, in order to realize a tilt angle $\theta$ which is equal to the maximum tilt angle , the liquid crystal molecules are required to be in a uniform alignment state as shown in FIG. 3 as will be described hereinafter. In fact, however, the liquid crystal molecules are in a splay alignment state which may be attributable to liquid crystal molecules adjacent to the respective substrates which are aligned with a twist, so that a sufficiently large tilt angle $\theta$ cannot be realized in some cases.

Accordingly, we have made experiments in order to realize a ferroelectric liquid crystal cell with a uniform alignment state. As a result, it has been found that a ferroelectric liquid crystal subjected to application of an alternating voltage with at least one of the voltage and the frequency thereof changing with time after the injection of a ferroelectric liquid crystal into the cell, can provide a sufficiently large tilt angle $\theta$, cause a "relaxation (phenomenon)" in response to an applied pulse with a prescribed waveform, and causes no change in transmittance in response to an alternating voltage or pulse voltage not exceeding the threshold voltage.

Figure 5A:
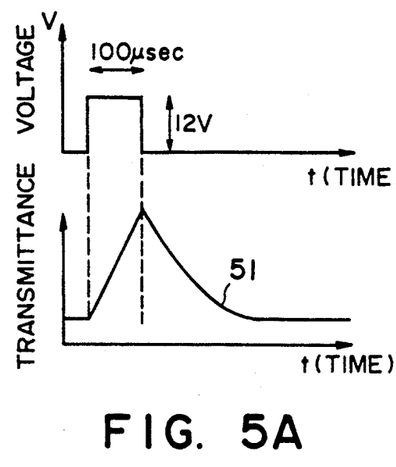
FIGS. 5A–5D are time charts for illustrating relationships between voltage pulses and changes in transmittance in response thereto.
Figure 5B:
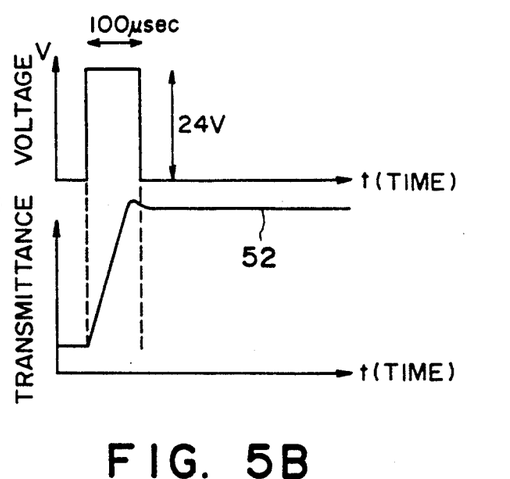
Figure 5C:
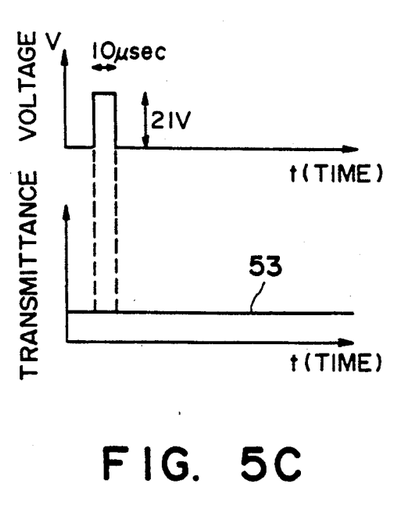
Figure 5D:
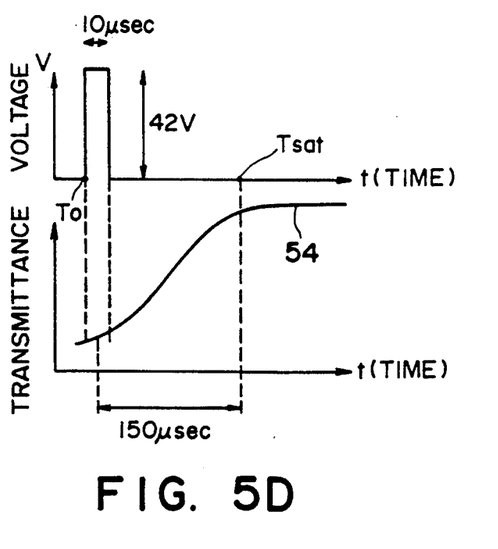

The above mentioned "relaxation" refers to a phenomenon of switching from one stable orientation state to the other stable orientation state due to a relaxational change in molecular arrangement caused continuously even after the removal of an applied pulse threshold voltage as shown in FIG. 5D. As a result, when a pulse voltage equal to the threshold voltage is applied to opposite electrodes, the ferroelectric liquid crystal disposed between the electrodes changes its molecular alignment or orientation from one stable state to the other stable state, and continuously causes the change in molecular alignment even after the subsequent removal of the pulse until the change in molecular alignment results in a saturated state (a state providing a saturation of an optical characteristic covered with the optical response, e.g., a transmittance) in a certain time.

The molecular alignment in the ferroelectric liquid crystal cell causing the relaxation phenomenon is such that the direction of a molecule is not always uniform in the direction of a molecular layer (vertical layer), and particularly the alignment direction of a molecule adjacent to a substrate is somewhat deviated from that of a molecular located in the midst of a molecular layer because of the anchoring effect exerted by the substrate surface subjected to a uniaxial orientation treatment.

The ferroelectric liquid crystal cell causing the relaxation phenomenon has a characteristic that it causes no transmittance change in response to an alternating or pulse voltage not exceeding the threshold voltage as mentioned above so that it can provide a display picture with a large contrast on the entire picture and free of flickering on the picture when it is applied to a display apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 6A–6C are respectively a time chart for illustrating the relationship between a voltage waveform applied to a pixel in a picture on writing and an optical response thereto, among which

DETAILED DESCRIPTION OF PREFERRED EMBODIMENTS

Figure 1:
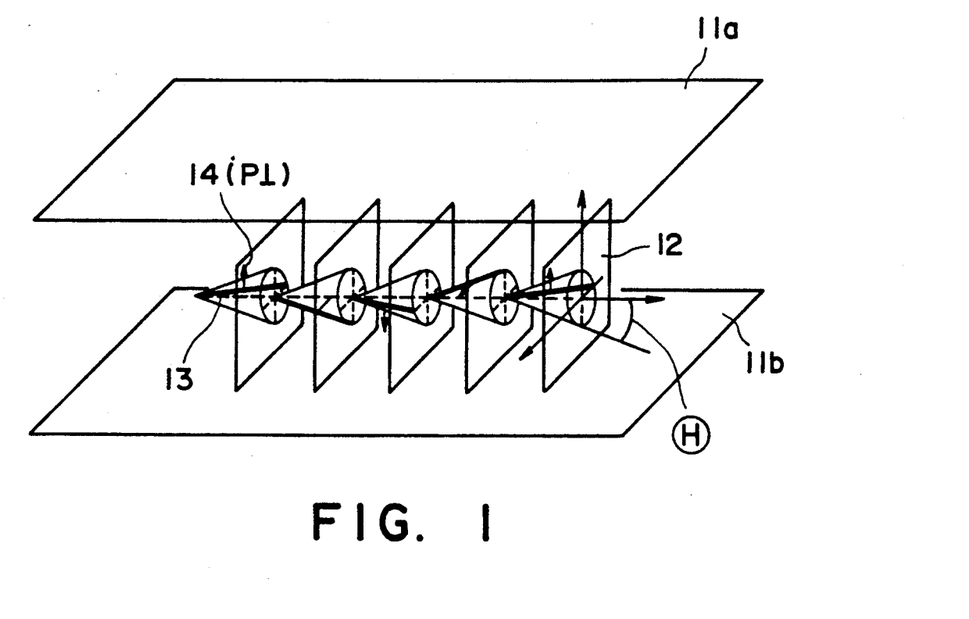
FIG. 1 is a schematic perspective view illustrating a liquid crystal device using a ferroelectric liquid crystal in a helical structure.

Referring to FIG. 1, there is schematically shown an example of a ferroelectric liquid crystal cell for explanation of the operation thereof. Reference numerals 11a and 11b denote substrates (glass plates) on which a transparent electrode of, e.g., $In_2O_3$, $SnO_2$, ITO (Indium Tin Oxide), etc., is disposed, respectively. A liquid crystal in SmC* (chiral smectic C phase) in which liquid crystal molecular layers 12 are aligned perpendicular to the glass substrate faces is hermetically disposed therebetween. Full lines 13 show liquid crystal molecules. Each liquid crystal molecule 13 has a dipole moment ($P_\perp$) 14 in a direction perpendicular to the molecular axis thereof. The liquid crystal molecules 13 successively form a helical structure in the direction of extension of the substrates. A half of the apical angle of the helical cone corresponds to the tile angle in the chiral smectic phase with a helical structure. When a voltage higher than a certain threshold level is applied between electrodes formed on the substrates 11a and 11b, the helical structure of the liquid crystal molecules 13 is unwound or released to change the alignment direction of respective liquid crystal molecules 13 so that the dipole moments ($P_\perp$) 14 are all directed in the direction of the electric field.

However, the ferroelectric liquid crystal in the helical structure is restored to its original helical structure in the absence of an electric field and does not show bistability as will be described hereinbelow.

Figure 2:
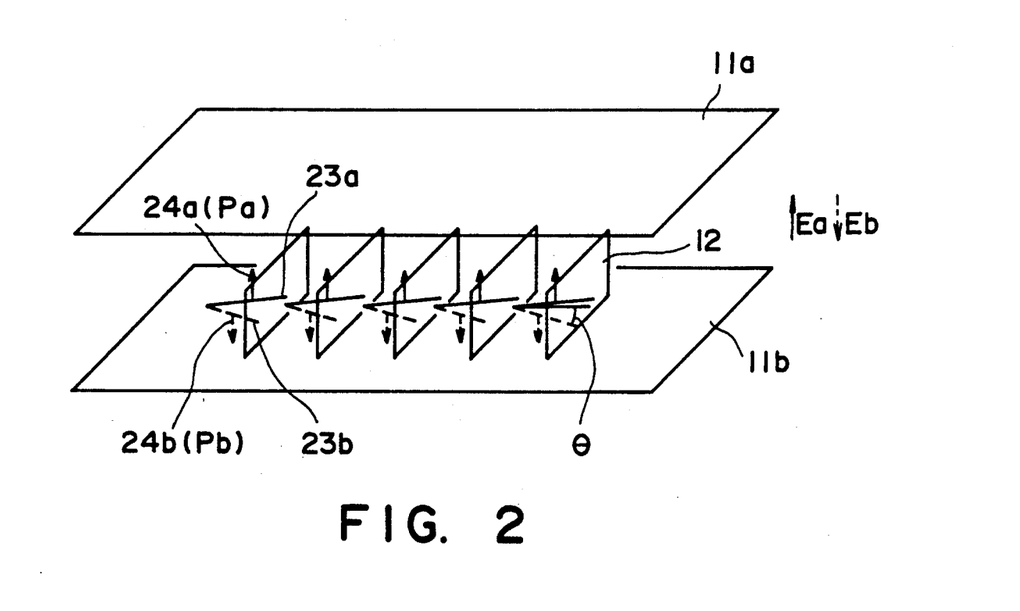
FIG. 2 is a schematic perspective view illustrating a liquid crystal device using a ferroelectric liquid crystal in a nonhelical structure.

In a preferred embodiment of the present invention, there may be used a ferroelectric liquid crystal device showing at least two stable orientation states, particularly bistability, in the absence of an electric field as shown in FIG. 2. More specifically, in a case where the liquid crystal layer thickness (cell gap) is made sufficiently thin (e.g., 1 μm), the helical structure of the liquid crystal molecules is unwound even in the absence of an electric field to assume a nonhelical structure, and the dipole moment assumes either of the two states, i.e., Pa in an upper direction 24a or Pb in a lower direction 24b to provide a bistable state, as shown in FIG. 2. When an electric field Ea or Eb higher than a certain threshold level and different from each other in polarity as shown in FIG. 2 is applied to a cell having the above mentioned characteristics, the dipole moment is directed either in the upper direction 24a or in the lower direction 24b depending on the vector of the electric field Ea or Eb. In correspondence with this, the liquid crystal molecules are oriented to either a first stable state 23a or a second stable state 23b. A half of the angle formed between the first and second stable states corresponds to a tilt angle $\theta$.

When such a ferroelectric liquid crystal device is used as an optical modulation device, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state 23a. This state is stably retained even if the electric field is removed. On the other hand, when the electric field Eb of which the direction is opposite to that of the electric field Ea is applied thereto, the liquid crystal molecules are oriented to the second stable state 23b, whereby the directions of the molecules are changed. This state 23b is also stably retained even if the electric field is removed. Further, as long as the magnitude of the electric field Ea or Eb is not above the certain threshold value, the liquid crystal molecules are placed in the respective orientation states. In order to effectively realize the fast response speed and the memory effect due to the bistability, the cell is preferably as thin as possible generally 0.5-20 μm, particularly 1-5 μm. Ferroelectric liquid crystal devices of the type as described above using a matrix electrode structure have been disclosed in U.S. Pat. Nos. 4,367,924 and 4,563,059, issued to N. A. Clark et al.

In the present invention, chiral smectic I phase, J phase, F phase, K phase or G phase may also be used in addition to the above mentioned SmC* and SmH* phases.

Examples of the ferroelectric liquid crystal material which may be used in the present invention include: p-decyloxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl -α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl -α-methylcinnamate, 4,4'-azoxycinnamic acid-bis (2-methylbutyl)ester, 4-O-(2-methyl)butylresorcylidene -4'-octylaniline, 4-(2'-methylbutyl)-phenyl -4'-octyloxybiphenyl-4-carboxylate, 4-hexyloxyphenyl -4-(2"-methylbutyl)biphenyl-4'-carboxylate, 4-octyloxyphenyl-4-(2"-methylbutyl)-biphenyl-4'-carboxylate, 4-heptylphenyl-4-(4"-methylhexyl) biphenyl-4'-carboxylate, and 4-(2"-methylbutyl) phenyl-4-(4"-methylhexyl)biphenyl-4'-carboxylate.

These materials may be used alone or in mixture of two or more species. Further, another cholesteric liquid crystal or smectic liquid crystal may be added thereto within an extent that the ferroelectricity is retained.

FIG. 3 is a sectional view of a ferroelectric liquid crystal device schematically showing a uniform alignment state, which is viewed in the direction of a normal to a vertical molecular layer composed of plural chiral smectic liquid crystal molecules. Referring to FIG. 3, reference numeral 31 denotes a projection (C-director) of a liquid crystal molecule 23a or 23b shown in FIG. 2 on the above vertical molecular layer 12, and reference numeral 32 denotes the tip of a liquid crystal molecule 23a or 23b onto the vertical molecular layer 12. According to FIG. 3, the liquid crystal molecules in a vertical molecular layer 12 are aligned substantially in parallel, so that the tilt angle $\theta$ can approach to the maximum tilt angle . This state is referred to as a uniform alignment state. In the ferroelectric liquid crystal cell causing a relaxation phenomenon according to the present invention, the ferroelectric liquid crystal assumes a sort of uniform alignment state wherein the C-directors 31 of liquid crystal molecules 23a or 23b at an intermediate position on the vertical molecular layer 12 are deviated from the C-directors 31 of the liquid crystal molecules 23a or 23b adjacent to the substrates 11a and 11b.

In a preferred embodiment according to the present invention, it is effective to apply an alternating voltage, particularly an AC voltage, with at least one of the magnitude and frequency changing with time, so that the ferroelectric liquid crystal cell will assume the above mentioned uniform alignment state causing a relaxation phenomenon. The alternating voltage applied for this purpose may preferably have a frequency of 10 Hz-5 KHz, particularly 100 Hz-1 KHz, and a voltage peak value of ±5 V-±50 V, particularly ±10 V-±30 V. Further, the duration changing with time may suitably be 10 msec 1 min, preferably 100 msec-10 sec. In this instance, the method changing voltage peak values may, for example, comprise applying an alternating voltage with a smaller peak value in the initial stage and applying an alternating voltage with a larger peak value in a subsequent second stage. Further, there may be used a method of applying an alternating voltage with a higher frequency in the initial stage and an alternating voltage with a lower frequency in a subsequent second stage. In the present invention, the period for applying the above mentioned alternating voltage, particularly AC voltage, as a whole may suitably be 100 msec-10 min, preferably 1 sec-1 min.

In a preferred embodiment, the ferroelectric liquid crystal cell may comprise, as an alignment control film, a polyvinyl alcohol film, particularly a modified polyvinyl alcohol film, subjected to a uniaxial orientation treatment such as rubbing.

Figure 8A:
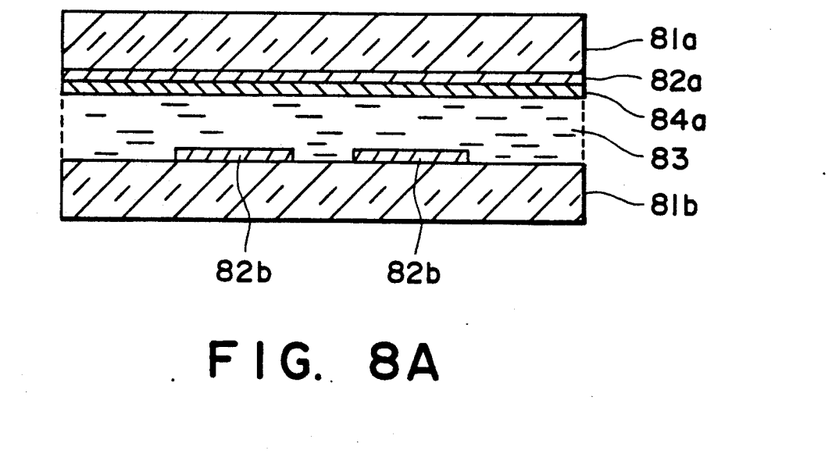
FIGS. 8A and 8B are respectively a sectional view of a liquid crystal device according to the present invention.
Figure 8B:
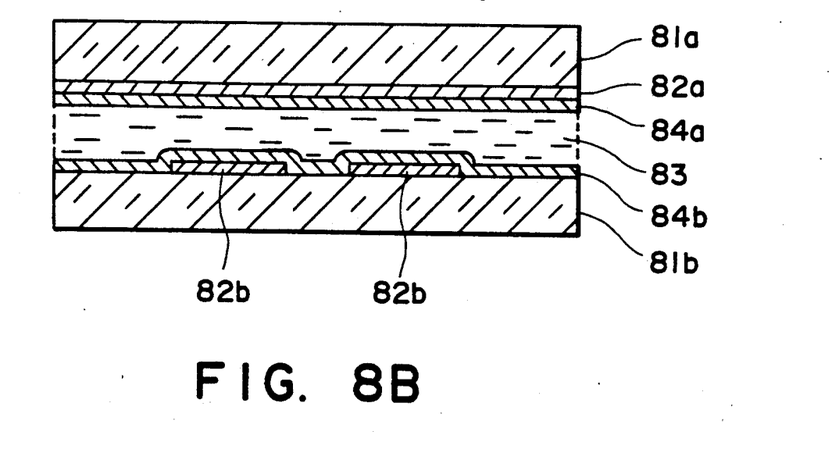

FIGS. 8A and 8B each show an embodiment of the liquid crystal device according to the present invention. The liquid crystal device shown in FIG. 8A comprises a pair of an upper substrate 81a and a lower substrate 81b provided with transparent electrodes 82a and 82b, respectively. Between the upper substrate 81a and the lower substrate 81b is disposed a ferroelectric liquid crystal 83 preferably with a nonhelical structure having at least two stable states. The electrodes 82a are covered with an alignment film 84a.

The transparent electrodes 82a and 82b may preferably be disposed in stripes respectively and in a mutually intersecting arrangement for multiplex driving of the ferroelectric liquid crystal 83.

In the liquid crystal device shown in FIG. 8B, the substrates 81a and 81b are provided with alignment control films 84a and 84b, respectively, of a modified polyvinyl alcohol film as mentioned above.

In the present invention, the alignment control films 84a and 84b may be provided with a uniaxial orientation axis. The uniaxial orientation axis may preferably be provided by rubbing. In this instance, the uniaxial orientation axes provided to the alignment control films 84a and 84b may be parallel with each other but can intersect with each other. The alignment control films 84a and 84b may generally have a thickness on the order of 50 Å–1 μm, preferably 100 Å–2000 Å.

The alignment control films 84a and 84b may for example be prepared by dissolving a modified polyvinyl alcohol resin in an appropriate solvent at a rate of 0.1 wt. %–20 wt. %, preferably 0.2 wt. %–10 wt. %, and applying the resultant solution by an appropriate coating method, such as the spinner coating method, the dipping coating method, the screen printing method, the spray coating method, and the roller coating method. The solvent used for this purpose may for example be water, glycol, glycerol, piperadine, triethylenediamine, formamide or dimethylformamide.

The modified polyvinyl alcohol used for constituting the alignment control films may for example be a silicon-containing polyvinyl alcohol containing a silicon element, a boron-containing polyvinyl alcohol containing a boron element, or a sulfur-containing polyvinyl alcohol containing a sulfur element. Among these, a silicon-containing polyvinyl alcohol may effectively be used.

The degree of modification in the modified polyvinyl alcohol film may suitably be 30 mol % or below, preferably be in the range of 1 mol %–20 mol %, particularly suitably be in the range of 1 mol %–10 mol %. Further, the degree of polymerization thereof may be 100–10000, preferably be 500–2000. Specific commercial product examples of the silane-modified polyvinyl alcohol include "R-1130", "R-2105" and "R-2130" (trade names) produced by Kuraray K. K.

Subsequently, a specific examples of ferroelectric liquid crystal cell actually produced will be described.

Liquid Crystal Cell A

Two sheets of 0.7 mm-thick glass plates were provided, and a 1000 Å-thick ITO film was formed on each glass plate and covered with a 1000 Å-thick SiO₂ vapor-deposition film. The glass plates provided with the ITO film and the SiO₂ film, were respectively coated with a 2 wt. %-aqueous solution of a silicon-containing polyvinyl alcohol ("R-2105", mfd. by Kuraray K. K.) by means of a spinner coater rotating at 2000 rpm for 15 sec. After the coating, the film was subjected to a heating treatment at 180° C. for about 1 hour. The resultant coating film thickness was about Å.

The film after the heating treatment was rubbed with a velvet cloth and the washed with isopropyl alcohol. Alumina beads with an average particle size of 0.8 μm were dispersed on one of the glass plates, and the two glass plates were superposed with each other so that their rubbing axes were parallel each other to prepare a cell.

The thickness (gap) of the cell was measured by means of Berck compensator (i.e., measurement by phase difference) to be about 0.7–0.8 μm. Into the cell was injected under vacuum an ester type ferroelectric liquid crystal ("CS-1014" (trade name), mfd. by Chisso K. K.) in the isotropic phase, and the liquid crystal was cooled at a rate of 0.5° C./hour down to 60° C. to be aligned. Experiment was thereafter conducted at 60° C.

The phase transition characteristics of "CS-1014" as mentioned above were as follows:

Then, the liquid crystal cell as mentioned above was supplied with a ½-duty rectangular wave AC voltage with peak values of ±25 volts and a frequency of 100 Hz for about 1 minute between opposite electrodes thereof. The liquid crystal cell subjected to the AC application treatment is referred to as "Liquid crystal cell A".

Liquid Crystal Cell B

Liquid crystal cell B was prepared in the same manner as in the preparation of the Liquid crystal cell A except that the AC application treatment was replaced by an AC application according to the following prescription.

Prescription For AC Application Treatment

First stage: A ½-duty rectangular wave AC voltage with peak: values of ±5 volts and a frequency of 50 Hz is applied for 10 seconds.

Second stage: A ½-duty rectangular wave AC voltage with peak: values of ±20 volts and a frequency of 50 Hz is applied for 10 seconds.

Liquid crystal cells showing similar functions as Liquid crystal cell B were also prepared according to the following prescriptions.

Different Prescription (1)

First stage: A ½-duty rectangular wave AC voltage with peak: values of ±10 volts and a frequency of 50 Hz is applied for 10 seconds.

Second stage: A ½-duty rectangular wave AC voltage with peak values of ±10 volts and a frequency of 10 Hz is applied for 10 seconds.

Different Prescription (2)

First stage: A ½-duty rectangular wave AC voltage with peak values of ±5 volts and a frequency of 50 Hz is applied for 4 seconds.

Second stage: A ½-duty rectangular wave AC voltage with peak values of ±10 volts and a frequency of 10 Hz is applied for 4 seconds.

Third stage: A ½-duty rectangular wave AC voltage with peak values of ±20 volts and a frequency of 50 Hz is applied for 4 seconds.

Liquid Crystal Cell C

A liquid crystal cell prepared by omitting the AC application treatment effected in Liquid crystal cells A and B is referred to as "Liquid crystal cell C".

Figure 4:
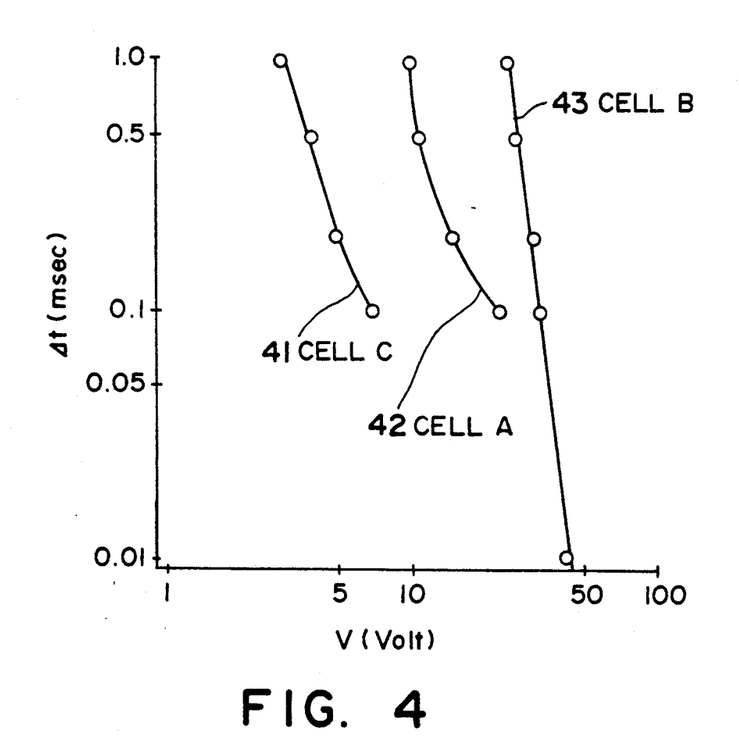
FIG. 4 is an explanatory view showing the threshold characteristics of liquid crystal cells A, B and C, respectively.

FIG. 4 is a graph showing the threshold characteristics of Liquid crystal cells A, B and C prepared above. Herein, the term "threshold" refers to the critical values of a pulse voltage applied to a ferroelectric liquid crystal cell above which the ferroelectric liquid crystal is transformed from one stable orientation state to the other stable orientation state, and the resultant other stable orientation state is retained even after the removal of the pulse voltage. The threshold is defined by the pulse duration $\Delta t$ and the voltage peak value $V_0$.

Referring to FIG. 4, the curve 41 represents the threshold characteristics of the cell C; the curve 42 represents the threshold characteristics of the cell A; and the curve 43 represents the threshold characteristics of the cell B. In FIG. 4, it is to be first noted that the cell A does not cause an inversion by a rectangular pulse with a duration of 100 μsec or shorter even if the pulse peak value is sufficiently large, while the cell B causes inversion by a pulse with a duration of 10 μsec or shorter if a sufficient peak value (about 40 volts or higher according to FIG. 4) is provided.

The fact that the cell B can cause a sufficient conversion by a pulse with a short pulse duration means that the cell B is applicable to a high speed driving as will be described hereinafter.

FIG. 4 secondly shows that the threshold characteristic curve of the cell B provides a much steeper slope than that of the cell A. The steepness in threshold characteristic curve leads to the advantages in a multiplex driving wherein a scanning signal is sequentially applied in phase with information signals. First is to provide a large driving margin, i.e., a large ratio of a voltage applied to a selected pixel to that applied to a half-selected pixel. Second is to broaden the flexibility of an information signal waveform applied to a nonselected pixel.

The reason for the above mentioned differences in threshold characteristics is not yet clear but may be considered as follows.

The cells A and B may have differences in alignment states of liquid crystal molecules and in alignment control functions of the substrates. As a result, with respect to the switching or inversion process, the switching is caused by a response of liquid crystal molecules capable of sufficiently following the applied pulse in the cell A while the response is not quick enough to immediately follow the applied pulse but relaxatively follows in the cell B. Thus, there may be a difference in dynamic interaction. The difference will become more clear when the following difference in switching characteristic is considered.

The tilt angles $\theta$ of the above mentioned cells A, B and C were measured to be 18° for the cells A and B and 6°-8° for the cell C.

The above mentioned tilt angle $\theta$ was measured by applying a pulse electric field (10 volts and 500 μsec) to a liquid crystal cell to uniformly provide one stable orientation state of liquid crystal molecules, rotating the liquid crystal cell under a pair of right angle cross nicol polarizers to a position providing the darkest state with the lowest light transmittance, applying a pulse electric field with a reverse polarity (−10 V and 500 μsec) to cause a transformation to the other stable molecular orientation state, and then rotating the cell again to a position providing the darkest state. The detection of two darkest positions corresponds to the detection of the two average molecular axes of the liquid crystal, and the angle between the two positions corresponds to $2\theta$, i.e., twice the tilt angle $\theta$.

The difference in switching characteristics between the cells A and B will now be explained with reference to FIGS. 5A–5D.

In FIGS. 5A–5D, the abscissas represent time and the ordinates represent a transmittance and a voltage value.

A pair of right angle polarizers were disposed respectively on both sides of liquid crystal cells A and B so as to provide the darkest state prior to the voltage pulse application.

The cure 51 in FIG. 5A represents an optical response of the cell A in response to a pulse below the threshold (pulse duration = 100 μsec, peak value = 12 V).

As will be understood from FIG. 5A, the cell A responds to the pulse below the threshold to change the transmittance, though the inversion of the liquid crystal molecules is not caused.

The curve 52 in FIG. 5B represents an optical response of the cell A in response to a pulse corresponding to the threshold (pulse duration = 100 μsec, peak value = 24 volts). As shown in FIG. 5B, a complete inversion is caused by the threshold pulse, and the period required for the inversion, i.e., the response time (defined herein as a period required for changing the transmittance from 10% to 90% based on the transmittance after the inversion), is rather shorter than the pulse application time, so that the response of the liquid crystal molecules is sufficiently quick to follow the application pulse.

The curve 53 in FIG. 5C represents an optical response of the cell B in response to a pulse below the threshold (pulse duration = 10 μsec, peak value = 21 volts) preferably not exceeding Vth/2 (Vth: threshold voltage).

FIG. 5C shows that the cell B does not optically respond to the pulse. Thus, in the case of application of a pulse below the threshold, the cell B does not cause fluctuation in molecular alignment state.

The curve 54 in FIG. 5D shows an optical response characteristic of the cell B in response to a pulse corresponding to the threshold (pulse duration = 10 μsec, peak value = 42 volts). As is clear from FIG. 5D, the cell B shows a response time which is considerably longer than the applied pulse duration so that the response of the liquid crystal molecules does not follow the applied pulse. In other words, the switching process of the cell B is clearly different from that of the cell A, and in the period of from the pulse application time $T_0$ to the time $T_{sat}$ at which the transmittance reaches the maximum, the liquid crystal molecules are relaxatively switched from one stable orientation state to the other stable orientation state even after the removal of the applied pulse.

Figure 6A:
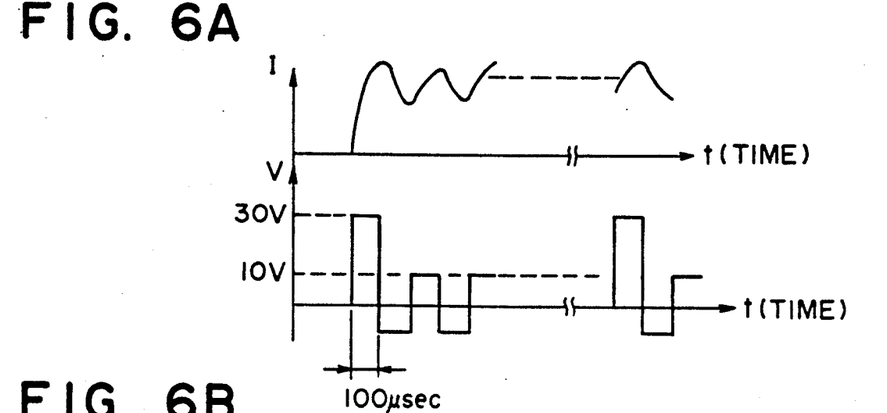
Figure 6B:
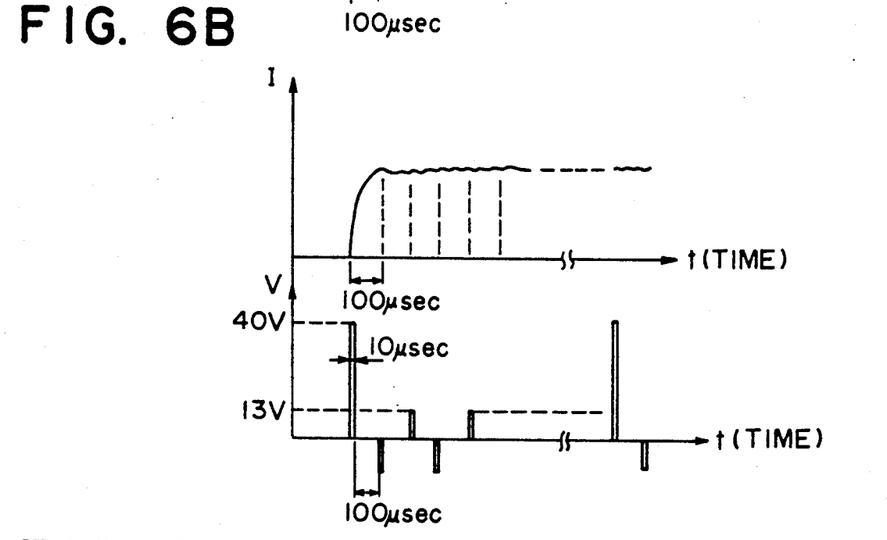

FIG. 6A shows an optical response characteristic curve of the cell A when it is driven by the driving waveform shown below in the figure. Further, FIG. 6B shows an optical characteristic curve of the cell B when it is driven by the driving waveform shown below in the figure. In the FIGS. 6A and 6B, respectively, wherein I denotes the transmittance and V denotes the voltage, a driving waveform applied to a pixel during a writing of a picture is shown at the lower half, and the transmittance waveform is shown at the upper half. In both cases of FIGS. 6A and 6B, a writing operation into a bright state is repeatedly carried out.

A liquid crystal device like the cell B as described above wherein switching is caused through relaxation of molecular alignment, can reduce a voltage effectively applied to a pixel on a nonselected scanning line during writing of a picture according to a matrix drive as shown in FIG. 6B, whereby a very clear image can be obtained. When the cells A and B both having an optical response speed of about 100 μsec, the cell B according to the present invention provides very little fluctuation in luminance.

Figure 6C:
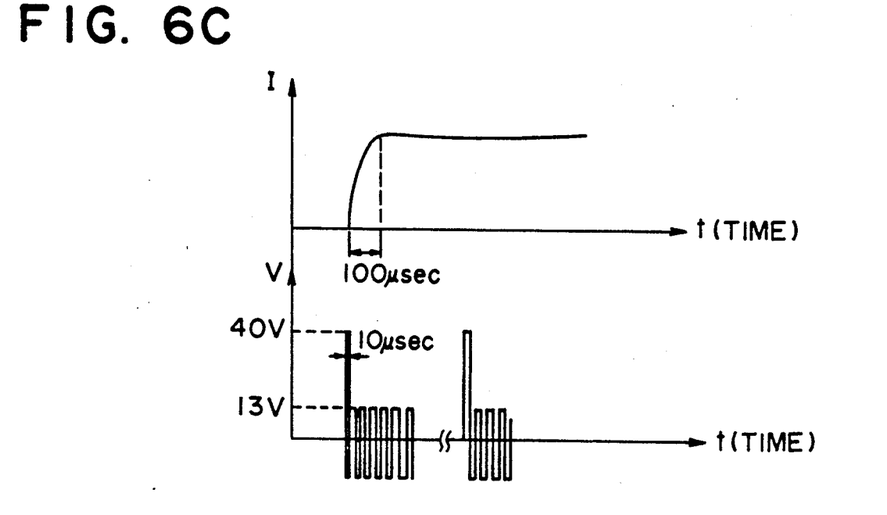
FIG. 6C shows a result obtained by the driving method according to the present invention.

Then, FIG. 6C shows a different embodiment of writing using a liquid crystal device whereby switching can be caused through relaxation. During the progress of the relaxation, other scanning electrodes are successively selected so that a very unique writing mode becomes possible. In this case, the luminance changes hardly due to a weak bias voltage (13 V, one third of driving voltage 40 V).

This is because the relaxation process is not at all related with the time constant of the liquid crystal cell or circuit but may be attributable to the physical properties (dynamic constant, electric time constant) of the ferroelectric liquid crystal. Clark and Lagerwall have described an example of optical response controlled by the time constant of a liquid crystal cell in "Applied Physics Letters", Vol. 36, No. 11, p.p. 899–901 (June 1, 1980). In this embodiment, however, the time constant of the liquid crystal cell itself is on the order of msec which is much longer than 100 μsec and the time constant of the circuit is on the order of 1 μsec or shorter which is much shorter. Thus, the "relaxation" in the present invention is a very powerful relaxation phenomenon which may be "dynamical" or "elastic" one caused subsequent to the local molecular alignment change in the liquid crystal layer, and the movement is stable and hardly affected by a weak electric field.

It has been found that the uniaxial alignment treatment makes a very significant contribution to the relaxation in the present invention. This may be attributable to a mechanism that the pre-tilt angle of molecules on the substrate surfaces plays an important role in the switching phenomenon.

Next, conditions for suppressing flickering during writing of a picture to obtain a high quality image will be further described.

In a case where scanning electrodes are selectively scanned line-sequentially, even if the writing signal applied to a selected pixel is a switching pulse of a single polarity, a pulse of a polarity opposite to that of the switching pulse is necessarily applied prior to the application of the writing signal when the pixels on the scanning line are cleared. Otherwise, a driving method may be possible, wherein prior to application of a pulse of a certain polarity, a pulse of the reverse polarity is intentionally applied in order to make the voltage applied to a pixel zero on an average. In any of these driving methods, a pulse of a reverse polarity is applied to a pixel. If a luminance change is caused by the application of the reverse polarity pulse, it provides an uneasy-to-see noise to a viewer.

Figure 7A:
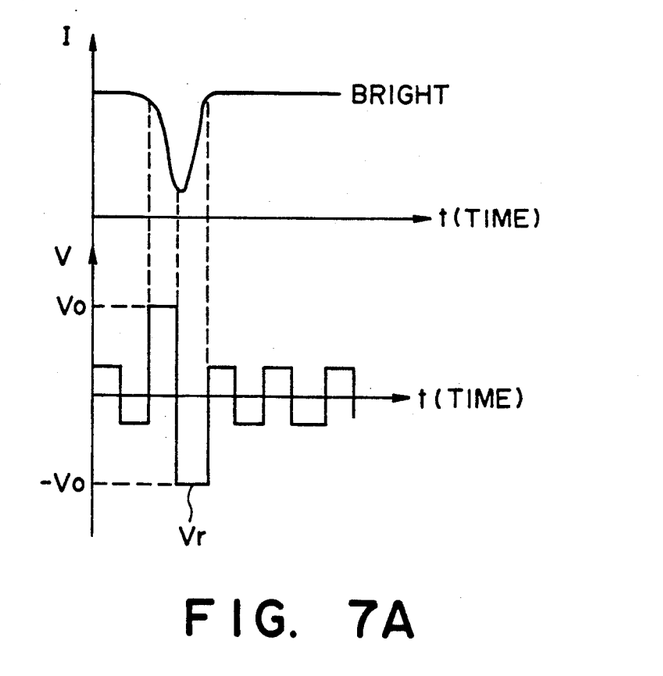
FIGS. 7A and 7B are respectively time charts for illustrating the relationship between the applied voltage waveform and the changes in transmittance according to a driving method not utilizing the relaxation effect and utilizing the relaxation effect.
Figure 7B:
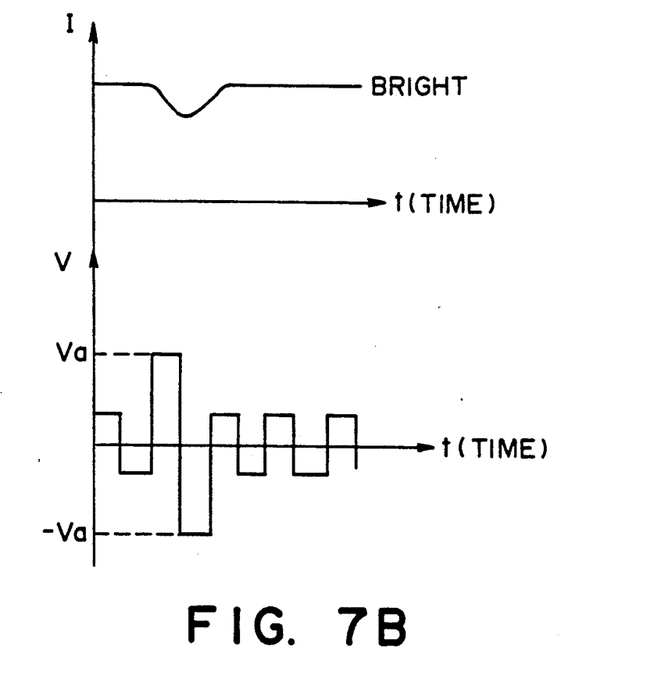

The above phenomenon can be prevented by utilizing the switching through relaxation according to the present invention. This effect is explained by referring to FIGS. 7A and 7B, among which FIG. 7B shows a case where a relaxation utilization factor $\alpha$ (described hereinafter) is 3, and FIG. 7A shows a case where the factor $\alpha < 1$, i.e., a case where the relaxation effect is not utilized and a large fluctuation in luminance is caused. In the figures, I denotes a transmittance and V denotes a voltage. The factor $\alpha$ is preferably as large as possible but may practically be 1.5 or above, preferably 3 or above, particularly preferably 5 or above.

More specifically, according to the present invention, there is also provided a driving method for a liquid crystal device comprising pixels arranged two-dimensionally, each pixel comprising a pair of opposite electrodes and a ferroelectric liquid crystal showing a first and a second alignment state depending on the direction of an electric field applied thereto and disposed between the opposite electrodes; the driving method comprising:

applying a writing pulse with a duration $\Delta t$ to a selected pixel thereby to change the molecular alignment state of the ferroelectric liquid crystal at the selected pixel from one molecular alignment state toward the other molecular alignment state; the ferroelectric liquid crystal at the selected pixel continuing the change in the molecular alignment state even after the removal of the writing pulse in a period until a saturation including a period $\tau_{90}$ which commences from the application of the writing pulse and terminates at a point when the optical characteristic of the selected pixel reaches 90% of that under the saturation; the period $\tau_{90}$ providing a relaxation utilization factor $\alpha$ satisfying:

$$\alpha = \tau_{90}/\Delta t \geq 1.5.$$

On the other hand, in a case where a motion picture such as a television picture is displayed according to the refreshing system, it is desired that the relaxation is completed within a period of one frame so as to avoid image remanence. The condition for satisfying this requisite is given by $$\alpha = \tau_{90}/\Delta t \leq n \cdot N,$$

wherein $n \cdot \Delta t$ is a selection period (duty) for one scanning electrode (n: a number of unit pulses constituting a scanning signal, $\Delta t$: a switching pulse duration), and N is the number of scanning electrodes.

As has been described before, the relaxative switching used in the present invention is very powerful and is not readily affected by a weak electric field. However, if too strong an electric field is applied during the relaxation process, the relaxation process can become unstable so that a desired switching may not be effected.

More specifically, for a pixel placed not in a relaxation process but in an equilibrium state, for example, a minimum voltage Vth required for causing switching is defined for a single pulse having a prescribed pulse duration, and no switching occurs in response to any voltage below the Vth. In a relaxation process, a more strict condition is required, and if a voltage of above about 80% of Vth is applied, the relaxative switching becomes very unstable. Thus, a voltage Vr applied to a pixel in the relaxation process should satisfy the following relation with respect to the threshold voltage Vth for causing switching in order to effect normal writing:

$$Vr/Vth \leq 0.8.$$

In the formula, the threshold voltage Vth means such a voltage Vth required for causing a switching that when a pulse of Vth is applied between opposite electrodes of a pixel, the ferroelectric liquid crystal at the pixel is caused to change its molecular alignment state from one stable state toward the other stable state and the change in molecular alignment state continuously occurs until the saturation state even after the removal of the pulse.

As described above, according to the present invention, there is provided a display device of a high quality wherein almost no change in contrast is involved between pixels on scanning and on nonscanning.

What is claimed is:

1. A driving method for a liquid crystal device comprising a plurality of pixels arranged two-dimensionally, each pixel comprising a pair of opposite electrodes and a ferroelectric liquid crystal showing a first and a second molecular alignment state depending on the direction of an electric field applied thereto, the ferroelectric liquid crystal being disposed between the opposite electrodes and being placed in a relaxed state in accordance with a time constant of the ferroelectric liquid crystal such that when a voltage pulse equal to or greater than the threshold voltage of the ferroelectric liquid crystal is applied between the opposite electrodes, the ferroelectric liquid crystal changes its molecular alignment state from one molecular alignment state towards the other molecular alignment state and the ferroelectric liquid crystal continues such change after the removal of the voltage pulse until the change reaches a saturation within a predetermined period; said driving method comprising the steps of:

applying a first writing pulse to a selected pixel to change the molecular alignment state of the ferroelectric liquid crystal at the selected pixel from one molecular alignment state toward the other molecular alignment state such that the ferroelectric liquid crystal continues such change after the removal of the first writing pulse until the change reaches the saturation within the predetermined period; and applying a second writing pulse to a subsequently selected pixel during the predetermined period, wherein in the predetermined period, the selected pixel supplied with the first writing pulse is supplied with a voltage pulse Vr which satisfies the relation with a threshold voltage Vth of:

$$Vr/Vth \leq 0.8,$$

wherein the threshold voltage Vth denotes a voltage required for causing a switching such that when a pulse of Vth is applied between the opposite electrodes of a pixel, the ferroelectric liquid crystal at the pixel is caused to change its molecular alignment state from the one molecular alignment state toward the other molecular alignment state and the change in the molecular alignment state continuously occurs until a saturation even after the removal of the pulse.

2. A method according to claim 1, wherein said ferroelectric liquid crystal is a chiral smectic liquid crystal in a nonhelical structure.

3. A method according to claim 2, wherein said chiral smectic liquid crystal is in C phase or H phase.

4. A method according to claim 1, wherein said pixels are arranged in a plurality of rows and columns, and the writing pulses are applied sequentially row by row.

5. A driving method for a liquid crystal device comprising a plurality of pixels arranged two-dimensionally, each pixel comprising a pair of opposite electrodes and a ferroelectric liquid crystal showing a first and a second alignment state depending on the direction of an electric field applied thereto and disposed between the opposite electrodes and being placed in a relaxed state in accordance with a time constant of the ferroelectric liquid crystal such that when a voltage pulse equal to or greater than the threshold voltage of the ferroelectric liquid crystal is applied between the opposite electrodes, the ferroelectric liquid crystal changes its molecular alignment state from one molecular alignment state towards the other molecular alignment state and the ferroelectric liquid crystal continues such change after the removal of the voltage pulse until the change reaches a saturation within a predetermined period; said driving method comprising the steps of:

applying a first writing pulse with a duration $\Delta t$ to a selected pixel thereby to change the molecular alignment state of the ferroelectric liquid crystal at the selected pixel from one molecular alignment state toward the other molecular alignment state; the ferroelectric liquid crystal at the selected pixel continuing the change in the molecular alignment state even after the removal of the first writing pulse in the predetermined period until a saturation including a period $\tau_{90}$ which commences from the application of the first writing pulse and terminates at a point when the optical characteristic of the selected pixel reaches 90% of that at the saturation; the period $\tau_{90}$ providing a relaxation utilization factor $\alpha$ satisfying:

$$\alpha = \tau_{90}/\Delta t \geq [1.5] \, 3; \text{ and}$$

applying a second writing pulse to a subsequently selected pixel during the predetermined period.

6. A method according to claim 5, wherein said relaxation utilization factor $\alpha$ is 5 or more.

7. A method according to claim 5, wherein said ferroelectric liquid crystal is a chiral smectic liquid crystal in a nonhelical structure.

8. A method according to claim 7, wherein said chiral smectic liquid crystal is in C phase or H phase.

* * * * *